No. 719,667. PATENTED FEB. 3, 1903.
E. HILL.
APPARATUS FOR DRYING HAT BODIES.
APPLICATION FILED SEPT. 6, 1902.
NO MODEL. 2 SHEETS—SHEET 1.

Witnesses
C. F. Kilgore
V. R. Holcomb

Inventor
Ebenezer Hill, by
Harry P. Williams,
Attorney

No. 719,667. PATENTED FEB. 3, 1903.
E. HILL.
APPARATUS FOR DRYING HAT BODIES.
APPLICATION FILED SEPT. 6, 1902.
NO MODEL. 2 SHEETS—SHEET 2.

Witnesses
C. F. Kilgore
V. R. Holcomb

Inventor
Ebenezer Hill, by
Harry P. Williams
Attorney

UNITED STATES PATENT OFFICE.

EBENEZER HILL, OF NORWALK, CONNECTICUT.

APPARATUS FOR DRYING HAT-BODIES.

SPECIFICATION forming part of Letters Patent No. 719,667, dated February 3, 1903.

Application filed September 6, 1902. Serial No. 122,363. (No model.)

*To all whom it may concern:*

Be it known that I, EBENEZER HILL, a citizen of the United States, residing at Norwalk, in the county of Fairfield and State of Connecticut, have invented certain new and useful Improvements in Drying Hat-Bodies, of which the following is a specification.

This invention relates to the drying of hat-bodies and recovery of the stiffening gum solvent.

The object of this invention is to provide a continuous method of and an apparatus for practicing a continuous method of drying hat-bodies and recovering the gum solvent.

Previously hat-bodies permeated with liquid stiffening material, such as shellac dissolved in alcohol, have been dried in chambers artificially heated, the heat being applied so as to act gradually or the temperature being raised gradually as the liquid evaporated from the hat-bodies. In such cases all the wet bodies were hung in place before the drying-chambers were closed and the heat turned on, and then after every body became dry all were removed and the temperature in the drying-chambers allowed to drop. By the prior processes the bodies which were nearer the heating apparatus were subjected to greater heat than those farther from the heating apparatus and the bodies that were put in first and removed last were subjected to the temperature of the drying-chamber longer than those which were put in last and removed first, so that the bodies dried unevenly, and if a very strong circulation were provided the evaporation took place too rapidly and soft spots and blisters appeared in the finished hats. With my process and apparatus for carrying out the process all of the bodies are subjected to the same temperatures for the same length of time in the drying-chamber—that is, the bodies that are put in first are taken out first—and the bodies are so manipulated in the drying-chamber that as they become drier they are subjected to drier and warmer air-currents, while, on the other hand, the vapor containing the evaporated solvent as it becomes drier is subjected to a cooler condensing medium, whereby the bodies are dried more rapidly, more uniformly, and more satisfactorily and the solvent is recovered more completely than previously and the process is continuous, so that time and labor are economized.

Figure 1:
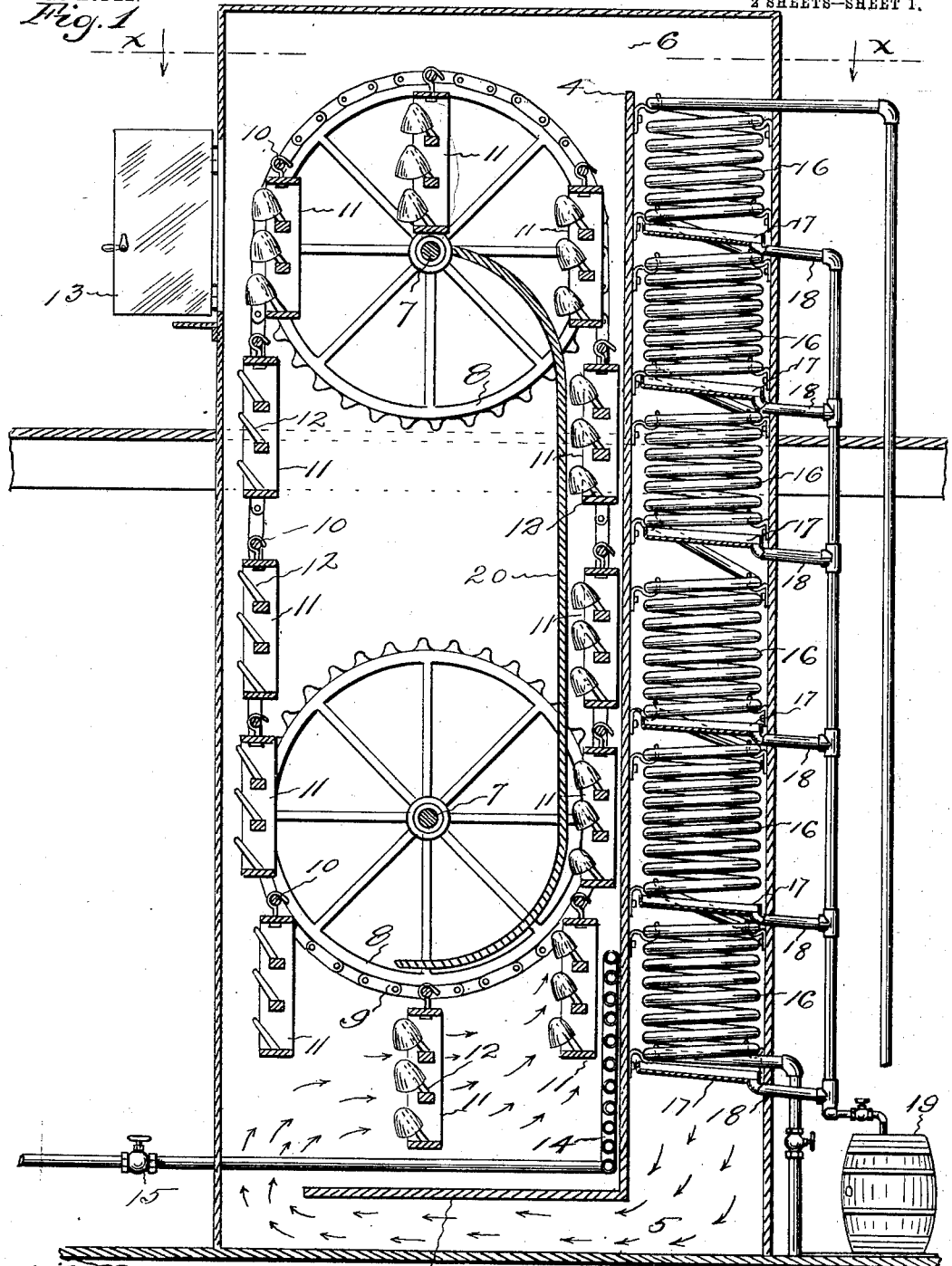
Figure 2:
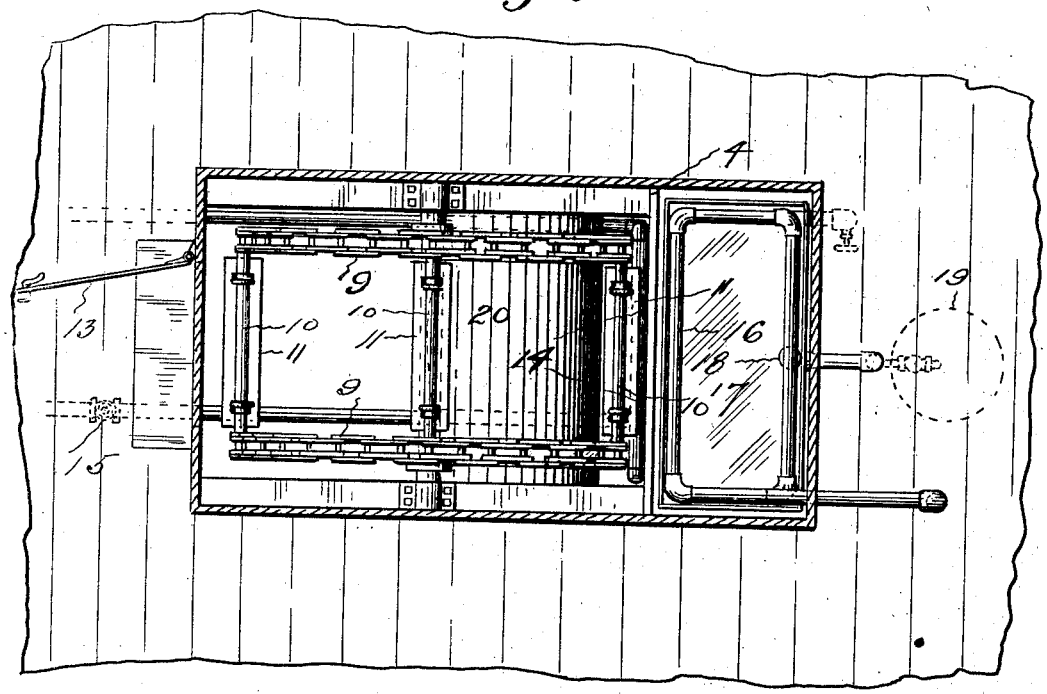
Figure 3:
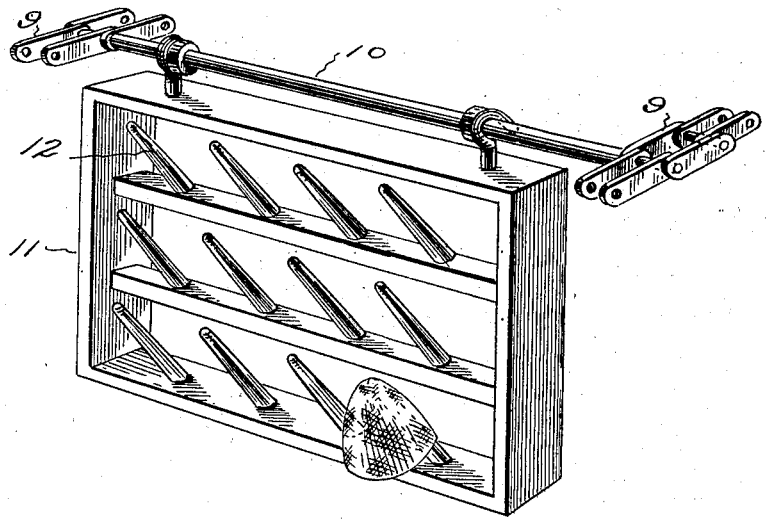

Figure 1 of the accompanying drawings shows a vertical section of an apparatus for carrying out the process. Fig. 2 shows a cross-sectional view of the apparatus on the plane indicated by the broken line $xx$ of Fig. 1, and Fig. 3 is a perspective view of one of the body-supporting racks.

The drying-chamber may be any desired height and may have any suitable cross-sectional area. The chamber shown is rectangular in cross-section and is designed to occupy two stories of a hat-factory. This chamber may be built of wood or metal, as desired. A partition 4 is arranged vertically across the chamber, so as to separate the front from the back. An opening 5 is left through this partition at the bottom, and an opening 6 is left through this partition at the top, so that the two divisions of the chamber are connected at the top and bottom. In the front division of the chamber, near the top and near the bottom, on axles 7 are skeleton drums 8. Around these drums pass endless chains 9, which at intervals may be connected by rods 10. The supporting-racks 11, with pegs 12, adapted to receive hat-bodies, are hung by hooks upon the rods that connect the chains, so that they will hang down and when they travel with the chains will pass between the drums. An opening with a door 13 is made in the wall of the chamber, preferably in front of the upper drum, so the racks with the wet hat-bodies may be passed in and hung on the chain-rods, and the racks may be removed from the chamber when the bodies are dry. Near the bottom of the forward division of the chamber, preferably just in front of the partition, is a suitable heating-coil 14. This heating-coil may be connected with any source of heat, as steam or hot water, and is provided with a cock 15 for controlling the flow of heating medium, and thus regulating the temperature of the chamber. A screen 20 is placed in the forward division of the chamber in front of the partition, so as to form a flue above the heating-coils. The bodies on the racks are carried by the chains down through this flue. Openings are of course made through the screen, so the drums may turn. In the rear division of the chamber, back of the partition, is a condensing-coil 16 of suitable capacity. This coil may be any desired shape and may be a continuous length or divided into sections. It is desirable to place trays 17 at different elevations between the coils for the purpose of collecting the condensed solvent. Pipes 18 from these trays lead through the back wall of the chamber to a receptacle 19, in which the solvent is stored. The cooling medium which is circulated through the coils may be water or any other suitable liquid forced by common means. A false bottom 21 may be located above the bottom of the drying-chamber to direct the dry chilled air to the front of the chamber. The temperature of the front portion of the chamber is raised to the desired degree by turning on sufficient steam. The temperature of the rear portion of the chamber is reduced to the desired degree by the flow of cooling medium through the condenser-coils. This causes a circulation in the chamber up in front of and down behind the partition.

The attendant opens the door and hangs a rack of wet hat-bodies upon the chains. When another rack of wet bodies is ready, the door is opened and the drums are turned either by means of a crank or by lifting on the chains, and this rack is hung upon the chains. This operation is repeated as often as the racks of wet bodies are ready until no more racks can be hung on the chain. Usually by the time that the chain is filled the bodies first put in are dry and are removed, allowing another rack of wet bodies to be hung up in their place. The bodies could be put upon the pegs without removing the racks from the chains, if desired.

With this apparatus the wet bodies are advanced toward the heating-coils as the solvent evaporates, and thus as they become drier are subjected to a warmer and drier current of air. As they are advanced downward toward the heating apparatus and are subjected to more heat at each step the action of the heat, while slow at first, increases rapidly and effects a thorough drying. By reason of this the temperature near the heating-coils may be high without deleteriously affecting the bodies, for by the time the bodies are brought adjacent to the heating-coils they are nearly dried. A powerful circulation of air is produced in the chamber upward from the heating-coils about the bodies on the front side of the partition and downward around the cooling-coils on the back side of the partition. The vapor which is conveyed by this circulation is drawn around the cooling-coils and when very wet is subjected to the action of the upper coils, and much of the moisture is precipitated. As the air and vapor descend and become drier by condensation they are brought into contact with cooler sections of the coils, for the water-cooling medium circulates from the bottom to the top through the coils, so that by the time the air reaches the bottom and is ready to be again heated it is very dry. This dry chilled air first comes in contact with the dry heated bodies and cools the bodies and becomes somewhat warmed before it reaches the heating-coils.

By placing the heating-coils and the cooling-coils in the same chamber a cheap construction is afforded and a very rapid circulation is produced; but of course two separated chambers connected by passages could be employed in exactly the same way. As a result of the rapid circulation and bringing the bodies as they become drier nearer to the heating-coils the process can be carried on very rapidly and the bodies dried uniformly and desirably, and by passing the vapor downwardly through the condensing-coils the air is very thoroughly dried and all the solvent reclaimed. The endless conveyer permits of the moving of the bodies as desired and also allows a continuous operation—that is, the drying may be carried on all day in the factory. All the bodies are kept in the chamber the same length of time, so the product is uniform.

This apparatus is economical, for it does not have to be cooled down after each lot of hats has been dried and then raised for drying the succeeding lot. The temperature is raised to the desired degree and kept there continuously while the apparatus is in use.

I claim as my invention—

1. An apparatus for drying wet bodies consisting of a chamber, a conveyer located in the chamber, a heating apparatus located in the chamber adjacent to a portion of the conveyer, a cooling apparatus located in the chamber, a partition separating the cooling apparatus from the conveyer and the heating apparatus and forming a flue, and conduits from the flue to a receptacle for collecting the liquid condensed by the cooling apparatus, substantially as specified.

2. An apparatus for drying wet bodies consisting of a chamber, a vertically-movable endless conveyer located in said chamber, a heating apparatus located in the bottom of said chamber, a cooling apparatus located at the back of said chamber, a partition separating the cooling apparatus from the conveyer and the heating apparatus and forming a flue, and conduits leading from the flue to a receptacle for collecting the liquid condensed by the cooling apparatus, substantially as specified.

3. An apparatus for drying wet bodies consisting of a chamber, an endless conveyer in the chamber, a heating apparatus adjacent to the conveyer, a cooling apparatus separated from the conveyer and the heater but connected at two levels with the chamber containing the heating apparatus and conveyer, moisture-collectors located at different elevations along the cooling apparatus and conduits leading from the collectors to a receptacle for receiving the condensed moisture, substantially as specified.

4. An apparatus for drying wet bodies consisting of a chamber, a partition dividing the chamber into two sections, a screen forming a flue in the front section, an endless conveyer in the front section of the chamber and adapted to travel down through the flue, a heating apparatus located near the bottom of the flue, and a cooling apparatus located in the rear section, substantially as specified.

EBENEZER HILL.

Witnesses:
HOWARD H. MOSSMAN,
H. R. WILLIAMS.